United States Patent
Yang et al.

(10) Patent No.: US 12,499,357 B2
(45) Date of Patent: Dec. 16, 2025

(54) DATA COMPRESSION METHOD, DATA COMPRESSION SYSTEM AND OPERATION METHOD OF DEEP LEARNING ACCELERATION CHIP

(71) Applicant: INDUSTRIAL TECHNOLOGY RESEARCH INSTITUTE, Hsinchu (TW)

(72) Inventors: Kai-Jiun Yang, Zhubei (TW); Gwo-Giun Lee, Tainan (TW); Chi-Tien Sun, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 1279 days.

(21) Appl. No.: 17/138,421

(22) Filed: Dec. 30, 2020

(65) Prior Publication Data

US 2022/0207342 A1 Jun. 30, 2022

(51) Int. Cl.
*G06N 3/08* (2023.01)
*G06F 9/30* (2018.01)
(Continued)

(52) U.S. Cl.
CPC .......... *G06N 3/065* (2023.01); *G06F 9/30036* (2013.01); *G06F 9/3836* (2013.01); *G06F 9/3877* (2013.01); *G06N 3/08* (2013.01)

(58) Field of Classification Search
CPC .......... G06N 3/065; G06N 3/08; G06N 3/044; G06N 3/063; G06F 9/30036;
(Continued)

(56) References Cited

U.S. PATENT DOCUMENTS 5,754,456 A * 5/1998 Eitan ................ G06F 9/30145
712/E9.034
10,411,727 B1 9/2019 Lan et al.
(Continued)

FOREIGN PATENT DOCUMENTS

CN 106877876 A 6/2017
CN 110390622 A 10/2019
(Continued)

OTHER PUBLICATIONS

Chen et al., "Eyeriss v2: A Flexible Accelerator for Emerging Deep Neural Networks on Mobile Devices," IEEE Journal On Emerging and Selected Topics in Circuits and Systems, vol. 9, No. 2, Jun. 2019, pp. 292-308.
(Continued)

*Primary Examiner* — Phenuel S Salomon
(74) *Attorney, Agent, or Firm* — Birch, Stewart, Kolasch & Birch, LLP

(57) ABSTRACT

A data compression method, a data compression system and an operation method of a deep learning acceleration chip are provided. The data compression method includes the following steps. A filter coefficient tensor matrix of a deep learning model is obtained. A matrix decomposition procedure is performed according to the filter coefficient tensor matrix to obtain a sparse tensor matrix and a transformation matrix, which is an orthonormal matrix. The product of the transformation matrix and the filter coefficient tensor matrix is the sparse tensor matrix. The sparse tensor matrix is compressed. The sparse tensor matrix and the transformation matrix, or the sparse tensor matrix and a restoration matrix, are stored in a memory. A convolution operation result is obtained by the deep learning acceleration chip using the sparse tensor matrix. The convolution operation
(Continued)

result is restored by the deep learning acceleration chip using the restoration matrix.

16 Claims, 10 Drawing Sheets

(51) Int. Cl.
 *G06F 9/38* (2018.01)
 *G06N 3/065* (2023.01)
(58) Field of Classification Search
 CPC .... G06F 9/3836; G06F 9/3877; G06F 9/3001; G06F 9/30043
 See application file for complete search history.

(56) References Cited

U.S. PATENT DOCUMENTS

| | | | |
|---|---|---|---|
| 10,528,864 | B2 | 1/2020 | Dally et al. |
| 11,086,968 | B1* | 8/2021 | Baskaran ............ G06F 16/1744 |
| 11,392,829 | B1* | 7/2022 | Pool ........................ G06F 17/16 |
| 2017/0235848 | A1 | 8/2017 | Van Dusen et al. |
| 2018/0032857 | A1* | 2/2018 | Lele ........................ G06N 3/084 |
| 2018/0121796 | A1* | 5/2018 | Deisher .................... G10L 15/16 |
| 2019/0190538 | A1 | 6/2019 | Park et al. |
| 2019/0244080 | A1 | 8/2019 | Li et al. |
| 2019/0266485 | A1* | 8/2019 | Singh .................... G06F 9/3001 |
| 2019/0303757 | A1 | 10/2019 | Wang et al. |
| 2019/0311253 | A1 | 10/2019 | Chung et al. |
| 2019/0311254 | A1 | 10/2019 | Turek et al. |
| 2019/0340510 | A1 | 11/2019 | Li et al. |
| 2020/0082268 | A1 | 3/2020 | Chiu et al. |
| 2020/0410327 | A1* | 12/2020 | Chinya ................. G06F 9/3814 |
| 2022/0108156 | A1* | 4/2022 | Hunter ................... G06N 3/048 |
| 2022/0108157 | A1* | 4/2022 | Hunter ...................... G06F 7/08 |

FOREIGN PATENT DOCUMENTS

| | | |
|---|---|---|
| CN | 110443354 A | 11/2019 |
| CN | 110874631 B | 6/2020 |
| CN | 107609641 B | 7/2020 |
| TW | I669921 B | 8/2019 |
| TW | 201944745 A | 11/2019 |
| TW | 202004658 A | 1/2020 |
| TW | I687063 B | 3/2020 |
| WO | WO 2020/233130 A1 | 11/2020 |

OTHER PUBLICATIONS

Chen et al., "Eyeriss: An Energy-Efficient Reconfigurable Accelerator for Deep Convolutional Neural Networks," IEEE Journal of Solid-State Circuits, 2016, pp. 1-12.
Han et al., "EIE: Efficient Inference Engine on Compressed Deep Neural Network," Stanford University, May 3, 2016, 12 pages.
Jiao et al., "A 12nm Programmable Convolution-Efficient Neural-Processing-Unit Chip Achieving 825TOPS," IEEE International Solid-State Circuits Conference, SESSION 7 / High-Performance Machine Learning / 7.2, 2020, pp. 136-139.
Kang et al., "GANPU: A 135TFLOPS/W Multi-DNN Training Processor for GANs with Speculative Dual-Sparsity Exploitation," IEEE International Solid-State Circuits Conference, SESSION 7 / High-Performance Machine Learning / 7.4, 2020, pp. 140-142.
Lin et al., "A 3.4-to-13.3TOPS/W 3.6TOPS Dual-Core Deep-Learning Accelerator for Versatile AI Applications in 7nm 56 Smartphone Soc," IEEE International Solid-State Circuits Conference, SESSION 7 / High-Performance Machine Learning / 7.1, 2020, pp. 134-136.
Valavi et al., "A Mixed-Signal Binarized Convolutional-Neural-Network Accelerator Integrating Dense Weight Storage and Multiplication for Reduced Data Movement," Symposium on VLSI Circuits Digest of Technical Papers, 2018, pp. 141-142.
Yue et al., "A 65nm 0.39-to-140.3TOPS/W 1-to-12b Unified Neural-Network Processor Using Block-Circulant-Enabled Transpose-Domain Acceleration with 8.1 x Higher TOPS/mm2 and 6T HBST-TRAM-Based 2D Data-Reuse Architecture," IEEE International Solid-State Circuits Conference, SESSION 7 / Machine Learning / 7 5 2019 pp. 138-140.
Taiwanese Office Action and Search Report for Taiwanese Application No. 110100978, dated Mar. 28, 2022.
Chinese Office Action and Search Report for Chinese Application No. 202110419932.X, dated Aug. 1, 2024.

* cited by examiner

DATA COMPRESSION METHOD, DATA COMPRESSION SYSTEM AND OPERATION METHOD OF DEEP LEARNING ACCELERATION CHIP

TECHNICAL FIELD

The disclosure relates in general to a data compression method, a data compression system and an operation method of a deep learning acceleration chip.

BACKGROUND

Along with the development in the deep learning technology, a deep learning acceleration chip is provided. With the deep learning acceleration chip, complicated convolution operation can be calculated using hardware, such that the operation speed can be increased.

The deep learning acceleration chip works with a high capacity memory and exchanges temporary data through a data bus. Ideally, data movement and data operation are performed at the same time. In actual situations, due to physical restrictions or the shared bus always being occupied with data movement, the operation efficiency of the deep learning acceleration chip does not meet the expectation. Moreover, primary power loss is caused by the access of an external memory. The Amdahl law also confirms that the increase in efficiency using parallelism has its limit. Recent research further shows that the limit falls at 10 TOPs/W. Therefore, it has become a prominent task for the deep learning acceleration chip to break through the above bottleneck.

SUMMARY

The disclosure is directed to a data compression method, a data compression system and an operation method of a deep learning acceleration chip.

According to one embodiment, a data compression method of a deep learning acceleration chip is provided. The data compression method of a deep learning acceleration chip includes the following steps. A filter coefficient tensor matrix of a deep learning model is obtained. A matrix decomposition procedure is performed according to the filter coefficient tensor matrix to obtain at least one sparse tensor matrix and at least one transformation matrix. The product of the transformation matrix and the filter coefficient tensor matrix is the sparse tensor matrix. The transformation matrix is an orthonormal matrix. The sparse tensor matrix is compressed. The sparse tensor matrix and the transformation matrix, or the sparse tensor matrix and a restoration matrix, are stored in a memory. A convolution operation result is obtained by the deep learning acceleration chip using the sparse tensor matrix. The convolution operation result is restored by the deep learning acceleration chip using the restoration matrix.

According to another embodiment, a data compression system of a deep learning acceleration chip is provided. The data compression system is used to reduce the data movement of a deep learning model. The data compression system includes a decomposition unit, a compression unit and a transfer unit. The decomposition unit is used to perform a matrix decomposition procedure according to a filter coefficient tensor matrix to obtain at least one sparse tensor matrix and at least one transformation matrix. The product of the transformation matrix and the filter coefficient tensor matrix is the sparse tensor matrix. The transformation matrix is an orthonormal matrix. The compression unit is used to compress the sparse tensor matrix. The transfer unit is used to store the sparse tensor matrix and the transformation matrix, or the sparse tensor matrix and a restoration matrix, in a memory. The deep learning acceleration chip obtains a convolution operation result using the sparse tensor matrix and restores the convolution operation result using the restoration matrix.

According to an alternate embodiment, an operation method of a deep learning acceleration chip. The operation method of a deep learning acceleration chip includes the following steps. At least one sparse tensor matrix and at least one transformation matrix, or the sparse tensor matrix and a restoration matrix, are accessed from a memory. The product of the transformation matrix and a filter coefficient tensor matrix of a deep learning model is the sparse tensor matrix. The transformation matrix is an orthonormal matrix. A convolution operation result is obtained using the sparse tensor matrix. The convolution operation result is restored using the restoration matrix.

The above and other aspects of the disclosure will become better understood with regard to the following detailed description of the preferred but non-limiting embodiment(s). The following description is made with reference to the accompanying drawings.

Figure 1:
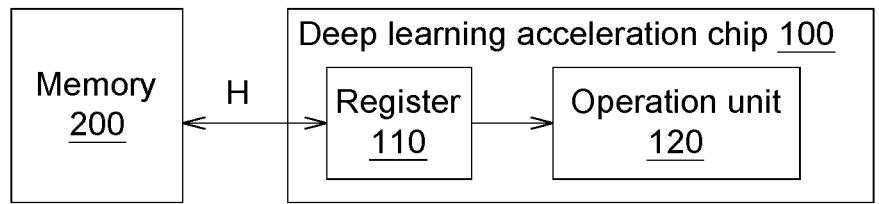
FIG. 1 is a schematic diagram of a deep learning acceleration chip according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Referring to FIG. 1, a schematic diagram of a deep learning acceleration chip 100 according to an embodiment is shown. During the operation process of the deep learning acceleration chip 100, a trained filter coefficient tensor matrix H of the deep learning model is stored in an external memory 200 (such as DRAM). After the filter coefficient tensor matrix H is transferred to a register 110, the filter coefficient tensor matrix H is operated by an operation unit 120.

The research personnel find that during the operation process of the deep learning acceleration chip 100, the most time-consuming and power-consuming operation is the access of the filter coefficient tensor matrix H from the memory 200. Therefore, the research personnel are devoted to reducing the data movement between the memory 200 and the deep learning acceleration chip 100, such that the processing speed of the deep learning acceleration chip 100 can be increased and the power consumption can be reduced.

Figure 2:
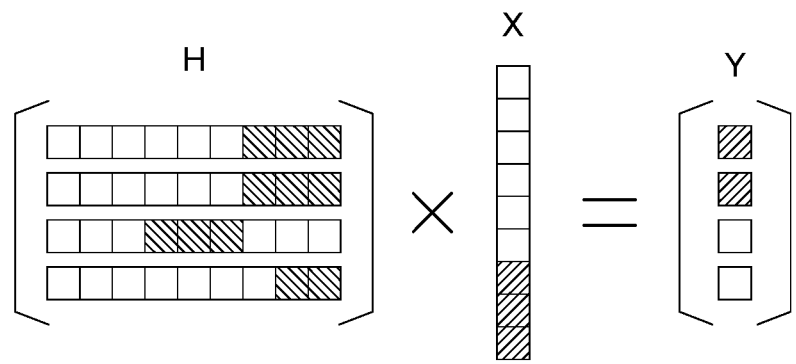
FIG. 2 is an operation process of a deep learning acceleration chip.
Figure 2:
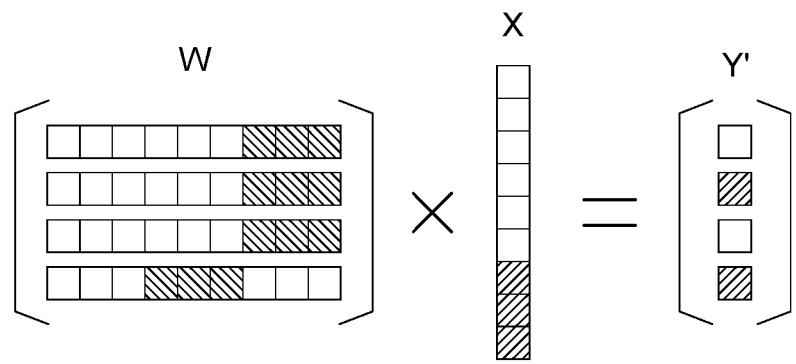
Figure 2:
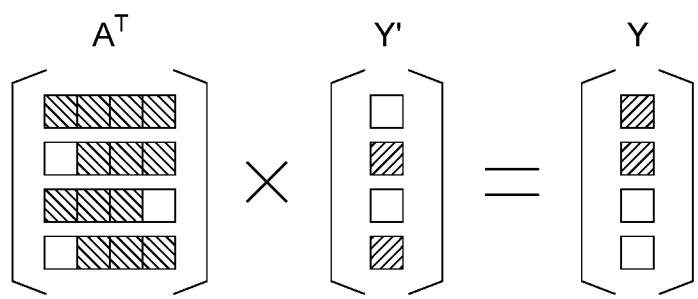

Referring to FIG. 2, an operation process of the deep learning acceleration chip 100 is shown. In the operation process of the deep learning acceleration chip 100, a filter coefficient tensor matrix H and a recognition data X are obtained. As indicated in FIG. 2 and formula (1), a convolution operation result Y can be obtained using the filter coefficient tensor matrix H and the recognition data X.

The filter coefficient tensor matrix H is a non-sparse matrix, and therefore cannot be compressed or can be compressed to a limited degree only. In the present embodiment, a sparse tensor matrix W can be obtained through a matrix decomposition procedure. As indicated in formula (2), the sparse tensor matrix W is a product of a transformation matrix A and the filter coefficient tensor matrix H. The transformation matrix is an orthonormal matrix. The sparse tensor matrix W is a sparse matrix, and therefore can be greatly compressed.

$$W = A \times H \quad (2)$$

The memory 200 can change to store the compressible sparse tensor matrix W and the transformation matrix A. Firstly, as indicated in FIG. 2 and formula (3), the deep learning acceleration chip 100 obtains a convolution operation result Y' using the sparse tensor matrix W.

$$W \times X = Y' \quad (3)$$

Then, as indicated in FIG. 2 and formula (4), the deep learning acceleration chip 100 restores the convolution operation result Y from the convolution operation result Y' using a restoration matrix $A^T$, which is a transpose matrix of the transformation matrix A.

$$\begin{aligned} A^T \times Y' &\quad (4) \\ &= A^T \times (W \times X) \\ &= A^T \times ((A \times H) \times X) \\ &= A^T \times A \times H \times X \\ &= H \times X \\ &= Y \end{aligned}$$

Figure 3:
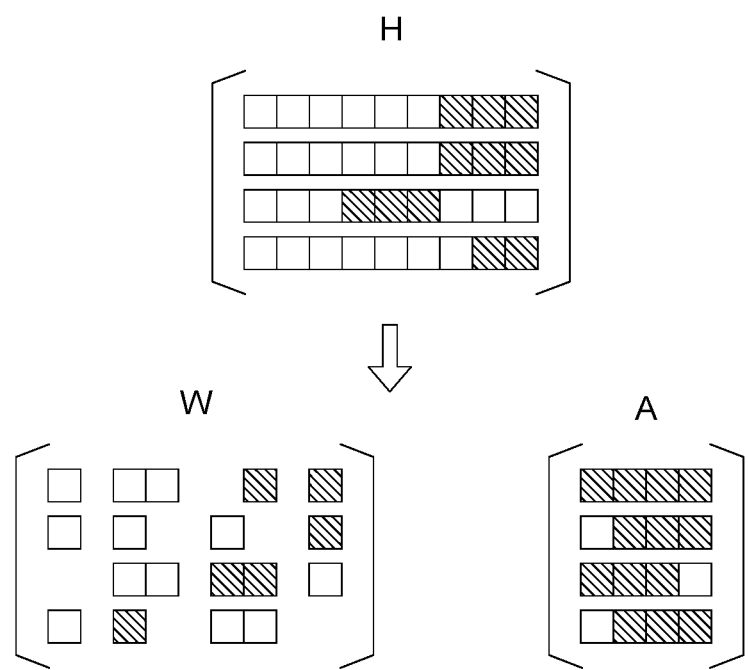
FIG. 3 is a schematic diagram of the change of the data that need to be stored in a memory.

Therefore, the convolution operation result Y obtained using the filter coefficient tensor matrix H can be replaced by the convolution operation result Y' obtained using the sparse tensor matrix W. The convolution operation result Y' can be restored as the convolution operation result Y without loss of information. Referring to FIG. 3, a schematic diagram of the change of the data that need to be stored in a memory y 200 is shown. As indicated in FIG. 3, the data that need to be stored in the memory 200 originally is the filter coefficient tensor matrix H, which is hard to compress. The data that need to be stored in the memory 200 can change to the compressible sparse tensor matrix W and the transformation matrix A. The transformation matrix A has a small data volume and will not add too much to the data volume. Thus, the data movement between the memory 200 and the deep learning acceleration chip 100 can be greatly reduced, such that the operation speed of the deep learning acceleration chip 100 can be increased and the power consumption can be reduced.

Figure 4:
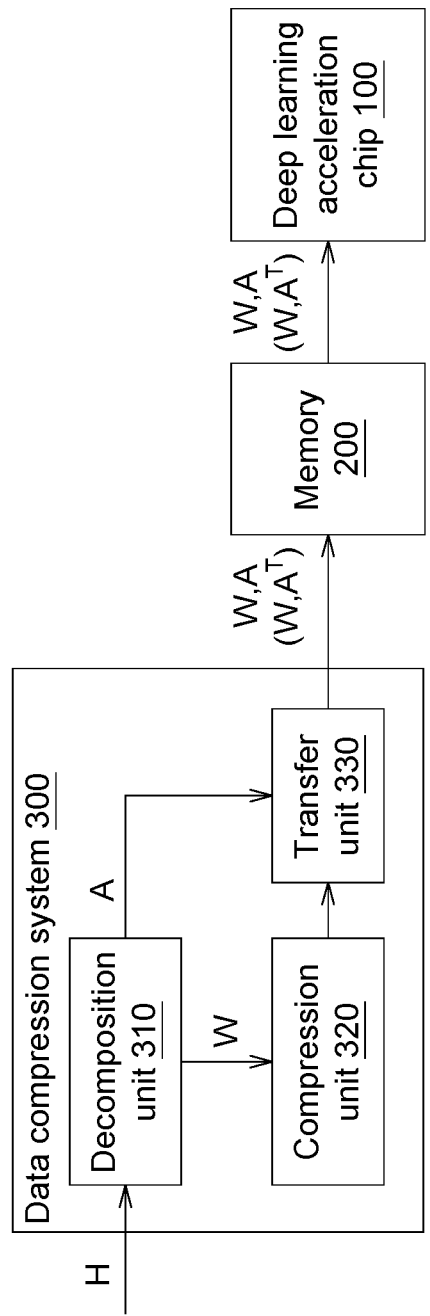
FIG. 4 is a block diagram of a data compression system of a deep learning acceleration chip according to an embodiment.

Referring to FIG. 4, a block diagram of a data compression system 300 of a deep learning acceleration chip 100 according to an embodiment is shown. The data compression system 300 is used to reduce the data movement of the deep learning model. The data compression system 300 includes a decomposition unit 310, a compression unit 320 and a transfer unit 330. Functions of each element are briefly disclosed below. The decomposition unit 310 is used to perform a matrix decomposition procedure. The compression unit 320 is used to perform a data compression procedure. The transfer unit 330 is used to perform a data movement procedure. The decomposition unit 310, the compression unit 320 and/or the transfer unit 330 can be realized by a circuit, a chip, a circuit board, or a storage device for storing programming codes. In the present embodiment, the data compression system 300 performs the matrix decomposition procedure using the decomposition unit 310 to obtain a sparse tensor matrix W and a transformation matrix A. The compression unit 320 can perform an operation on the sparse tensor matrix W. Thus, the data that need to be stored in the memory 200 can change to the compressible sparse tensor matrix W and the transformation matrix A to greatly reduce the data movement, such that the operation speed of the deep learning acceleration chip 100 can be increased and the power consumption can be reduced. Detailed descriptions of the operation of each of the above element are disclosed below with a flowchart.

Figure 5:
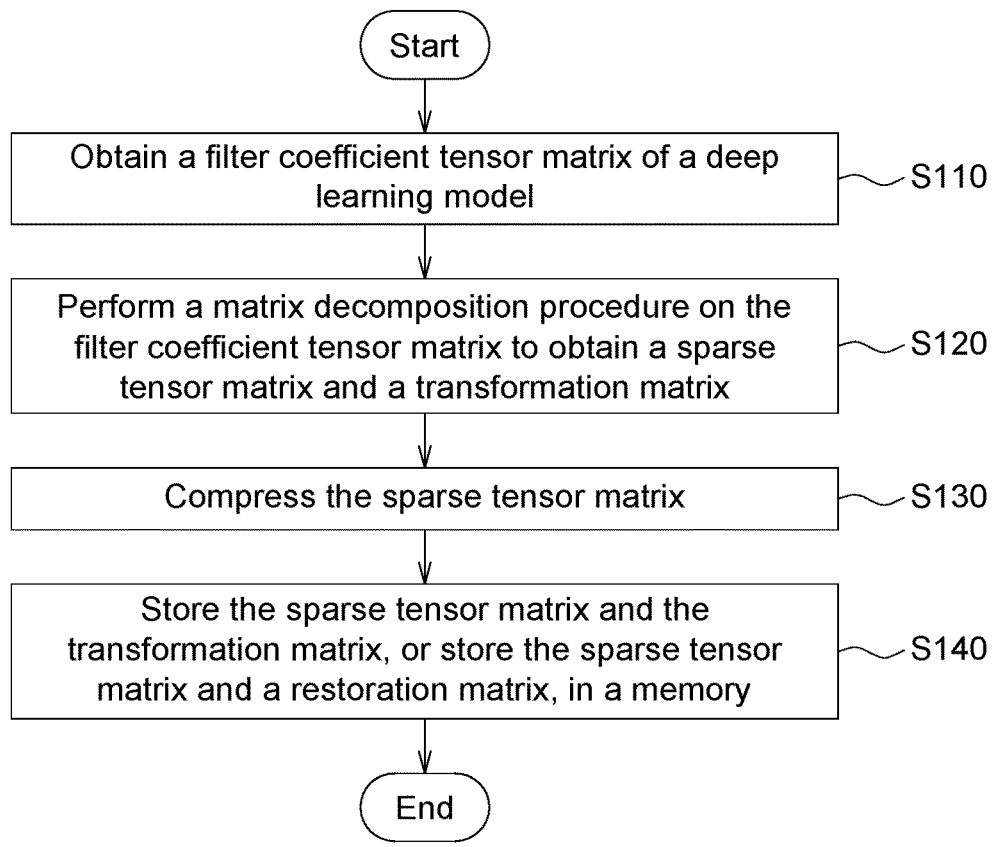
FIG. 5 is a flowchart of a data compression method of a deep learning acceleration chip according to an embodiment.

Referring to FIG. 5, a flowchart of a data compression method of a deep learning acceleration chip 100 according to an embodiment is shown. Firstly, the method begins at step S110, a filter coefficient tensor matrix H of the deep learning model is obtained by a decomposition unit 310, wherein the filter coefficient tensor matrix H is a non-sparse matrix, which cannot be compressed or can be compressed to a limited degree only.

Next, the method proceeds to step S120, a matrix decomposition procedure is performed according to the filter coefficient tensor matrix H by the decomposition unit 310 to obtain a sparse tensor matrix W and a transformation matrix A. The product of the transformation matrix A and the filter coefficient tensor matrix H is the sparse tensor matrix W (referring to formula (2)). The transformation matrix A is an orthonormal matrix. After the filter coefficient tensor matrix H is multiplied with the transformation matrix A, the matrix will consist of a large number of identical values, that is. Such matrix is referred as the sparse matrix.

Then, the method proceeds to step S130, the sparse tensor matrix W is compressed by a compression unit 320. In the present step, the compression unit 320 can compress the sparse tensor matrix W using run-length encoding, compressed sparse column format, or a cross linked list.

Then, the method proceeds to step S140, the compressed sparse tensor matrix W and the transformation matrix A, or the compressed sparse tensor matrix W and a restoration matrix $A^T$, are stored in a memory 200 by a transfer unit 330. The deep learning acceleration chip 100 can obtain the convolution operation result Y' using the sparse tensor matrix W (referring to formula (3)). The deep learning acceleration chip 100 can restore the convolution operation result Y' as the convolution operation result Y using the restoration matrix $A^T$ (referring to formula (4)). Details of the operations of the deep learning acceleration chip 100 using the sparse tensor matrix W and the transformation matrix A (or the restoration matrix $A^T$) of the present embodiment are disclosed below with a flowchart.

Figure 6:
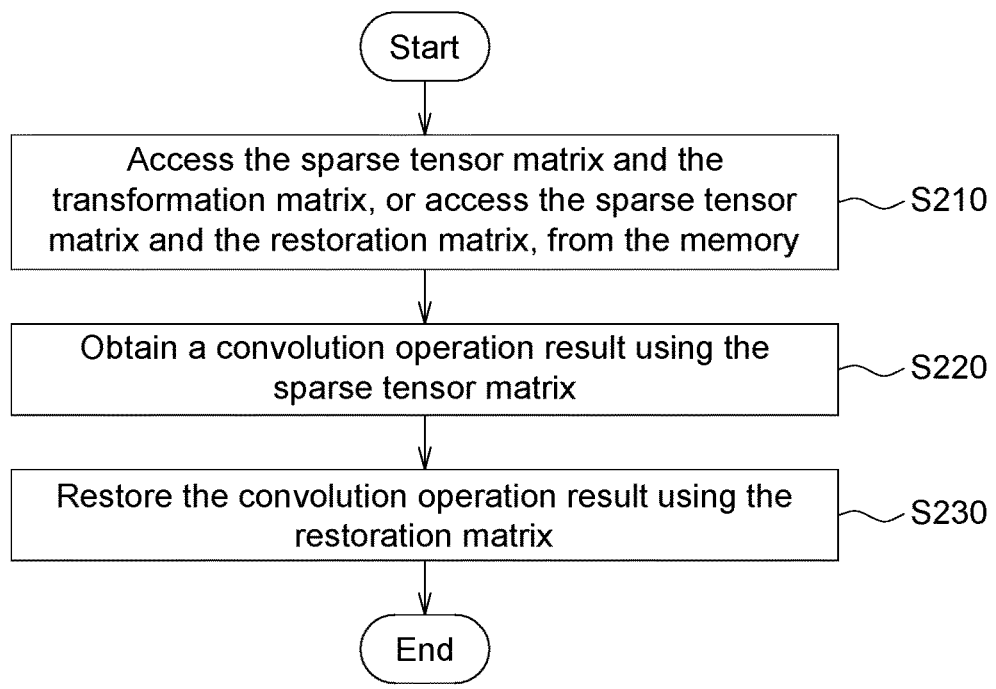
FIG. 6 is a flowchart of an operation method of a deep learning acceleration chip according to an embodiment.

Referring to FIG. 6, a flowchart of an operation method of a deep learning acceleration chip 100 according to an embodiment is shown. Firstly, the method begins at step S210, the sparse tensor matrix W and the transformation matrix A, or the sparse tensor matrix W and the restoration matrix $A^T$, are accessed from a memory 200 by the deep learning acceleration chip 100. The product of the transformation matrix A and the filter coefficient tensor matrix H of the deep learning model is the sparse tensor matrix W, which is an orthonormal matrix. The restoration matrix $A^T$ is a transpose matrix of the transformation matrix A. What is stored in the memory 200 is not the filter coefficient tensor matrix H. In the present step, if the transformation matrix A is accessed from the memory 200, then the deep learning acceleration chip 100 can further obtain the restoration matrix $A^T$ using the transformation matrix A without consuming too much time. The operation of matrix transpose does not consume too much time or power.

Next, the method proceeds to step S220, the convolution operation result Y' is obtained by the deep learning acceleration chip 100 using the sparse tensor matrix W (referring to formula (3)). The convolution operation result Y' is not the final result. Since the sparse tensor matrix W is a sparse matrix, the operation of the sparse tensor matrix W in the present step is much faster than the operation of the filter coefficient tensor matrix H.

Then, the method proceeds to step S230, the convolution operation result Y' is restored by the deep learning acceleration chip 100 using the restoration matrix $A^T$ (referring to formula (4)). Therefore, the convolution operation result Y originally obtained using the filter coefficient tensor matrix H can be replaced by the convolution operation result Y' obtained using the sparse tensor matrix W, and the convolution operation result Y' can be restored as the convolution operation result Y without loss of information.

Figure 7:
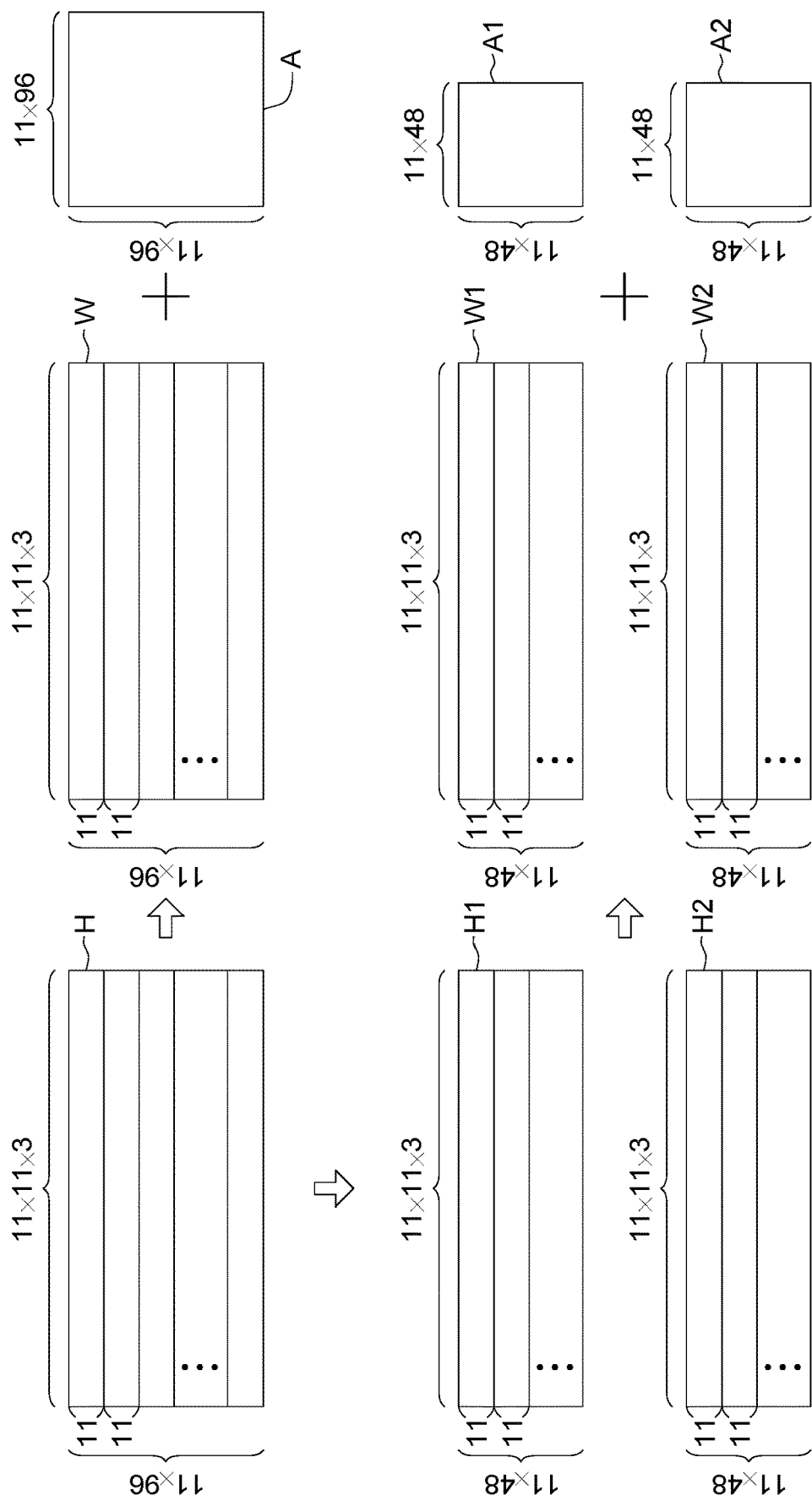
FIG. 7 is a matrix decomposition procedure of a filter coefficient tensor matrix according to an embodiment.

Besides, the research personnel further reduce the data movement using the matrix partition technique. Referring to FIG. 7, a matrix partition procedure of a filter coefficient tensor matrix H according to an embodiment is shown. As indicated in FIG. 7, the recognition data X (illustrated in FIG. 2) to be recognized by the deep learning model is a 11 pixels by 11 pixels color image, wherein each pixel has 3 pixel values for red, green and blue. Since the deep learning model has 96 filters, the deep learning model needs to train a (11*96)*(11*11*3) filter coefficient tensor matrix H. According to the above step, a (11*96)*(11*11*3) sparse tensor matrix W and a (11*96)*(11*96) transformation matrix A can be obtained from the matrix decomposition procedure.

The research personnel can partition the filter coefficient tensor matrix H into M parts using the matrix partition technique, wherein M is $2^N$, and N is a natural number, in the example of FIG. 7, N=1. The filter coefficient tensor matrix H is partitioned into two (11*48)*(11*11*3) filter coefficient tensor matrixes H1 and H2, which have the same size. According to the above step, a (11*48)*(11*11*3) sparse tensor matrix W1 and a (11*48)*(11*48) transformation matrix A1 can be obtained from the matrix decomposition procedure performed according to the filter coefficient tensor matrix H1; and a (11*48)*(11*11*3) sparse tensor matrix W2 and a (11*48)*(11*48) transformation matrix A2 can be obtained from the matrix decomposition procedure performed according to the filter coefficient tensor matrix H2. The sparse tensor matrixes W1 and W1 have the same size, and the transformation matrixes A1 and A2 also have the same size.

The data that need to be stored in the memory 200 can be the compressible sparse tensor matrixes W1 and W2 and the transformation matrixes A1 and A2. Since the data volume of the transformation matrixes A1 and A2 is significantly lower than that of the transformation matrix A, the data movement can be further reduced. The sparseness of the sparse tensor matrixes W1 and W2 can be lower than the sparseness of the sparse tensor matrix W. As long as the data restoration of the transformation matrixes A1 and A2 relative to the transformation matrix A is larger than the data increase of the sparse tensor matrixes W1 and W2 relative to the sparse tensor matrix W, the matrix partition procedure of FIG. 7 still can be used to reduce the entire data volume.

Figure 8A:
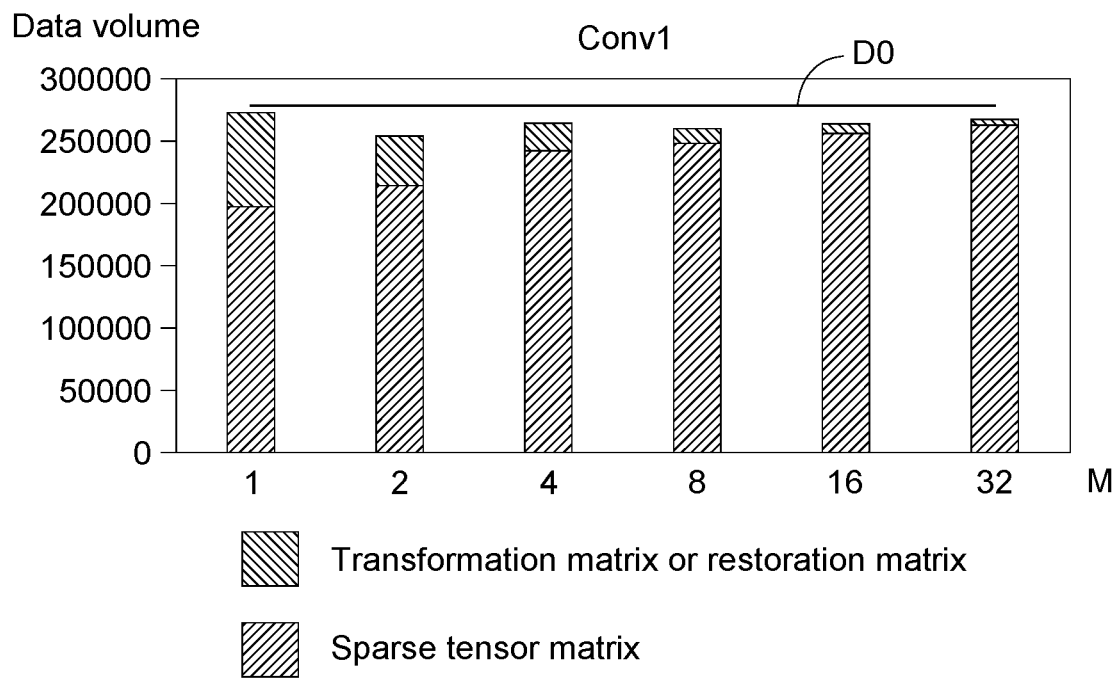
FIGS. 8A to 8E are comparison results of the data volumes corresponding to different convolution layers according to an embodiment.
Figure 8B:
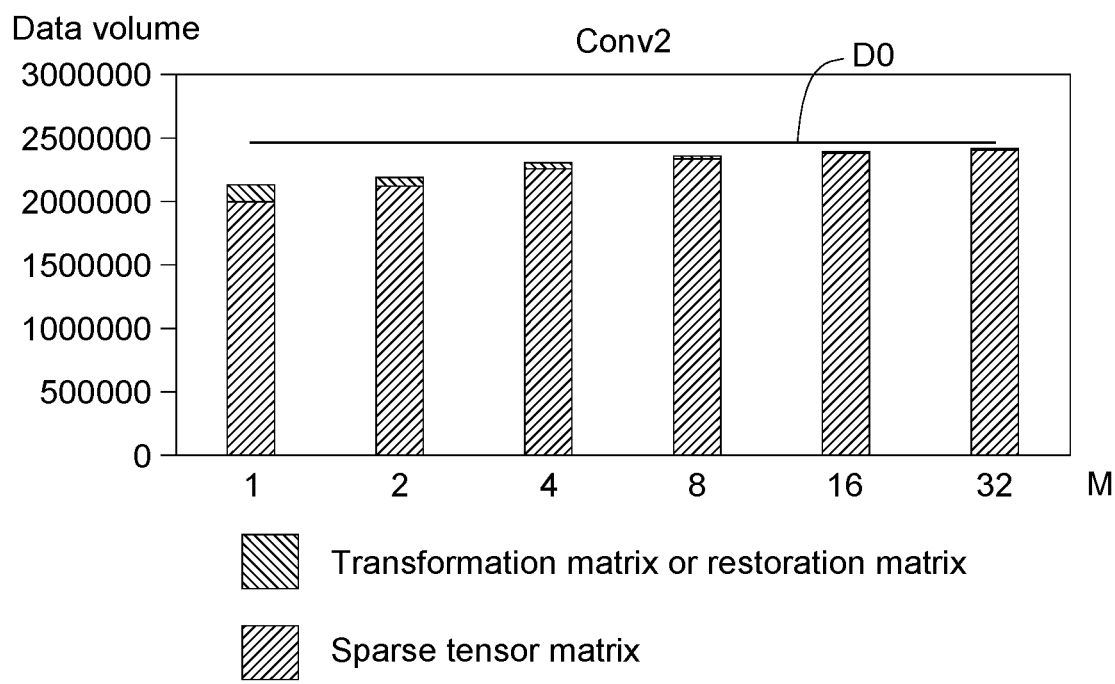
Figure 8C:
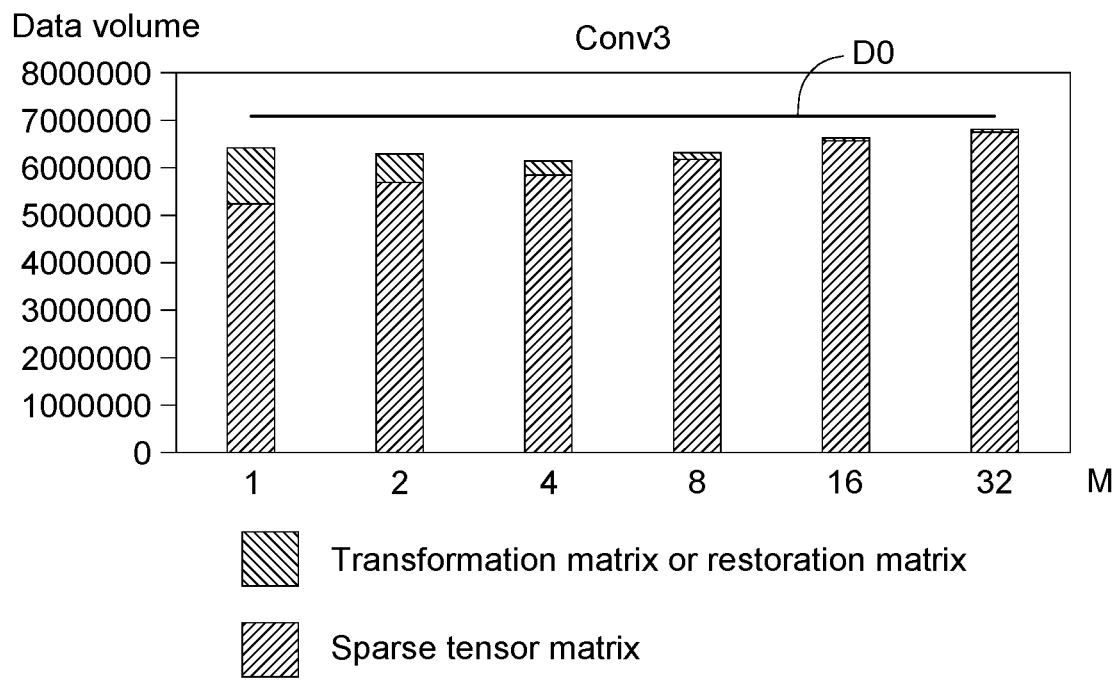
Figure 8D:
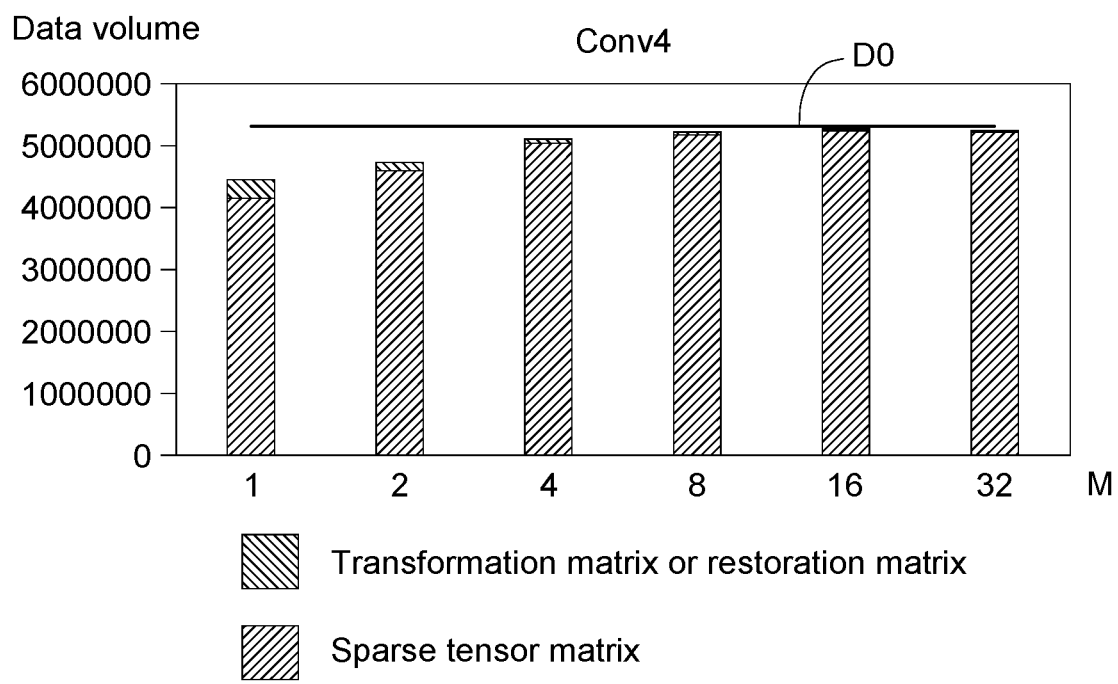
Figure 8E:
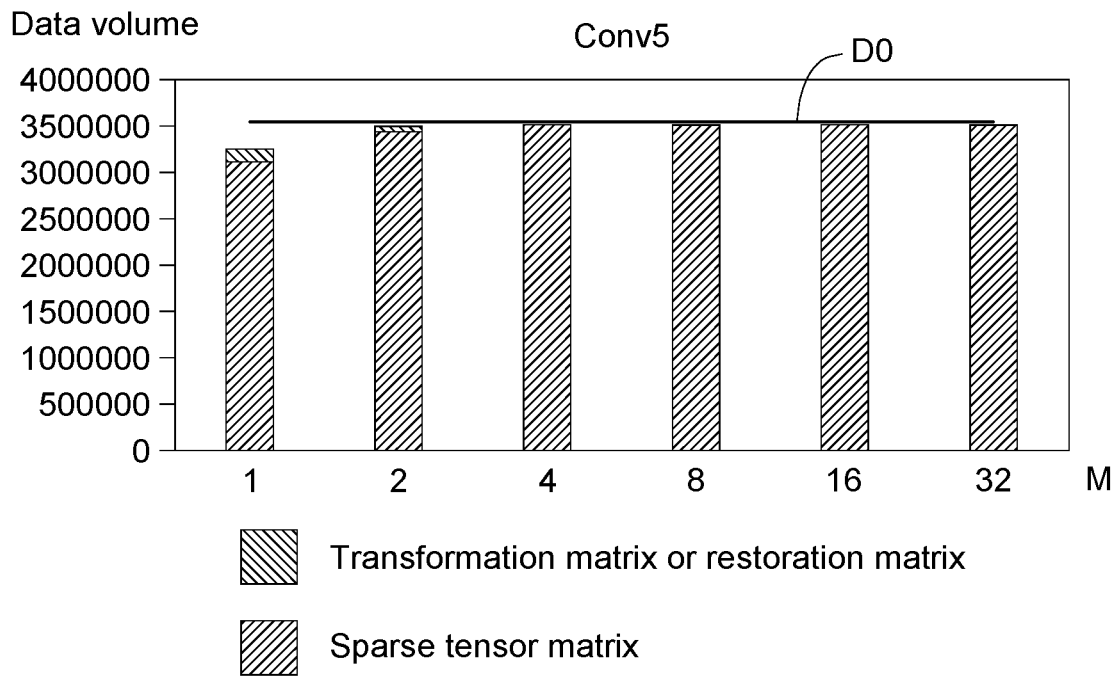

In the example of FIG. 7, N is exemplified by N=1, but different results can be generated when N=2, 3, 4, . . . , etc. The data compression system 300 can determine a most suitable value for N according to the comparison result of the entire data volume. Referring to FIGS. 8A to 8E, comparison results of the data volumes corresponding to different convolution layers Conv1 to Conv5 according to an embodiment are shown. As indicated in FIG. 8A, in the convolution layer Conv1, when M=1, 2, 4, 8, 16, 32 (that is, N=0, 1, 2, 3, 4, 5), the entire data volume is lower than the original data volume DO of the filter coefficient tensor matrix H, wherein the data compression system 300 can obtain the largest data restoration when the convolution layer Conv1 sets M=2(N=1). As indicated in FIG. 8B, in the convolution layer Conv2, the data compression system 300 can obtain the largest data restoration when the convolution layer Conv2 sets M=1(N=0). As indicated in FIG. 8C, in the convolution layer Conv3, the data compression system 300 can obtain the largest data restoration when the convolution layer Conv3 sets M=4(N=2). As indicated in FIG. 8D, in the convolution layer Conv4, the data compression system 300 can obtain the largest data restoration when the convolution layer Conv4 sets M=1(N=0). As indicated in FIG. 8E, in the convolution layer Conv5, the data compression system 300 can obtain the largest data restoration when the convolution layer Conv5 sets M=1(N=0).

Figure 8F:
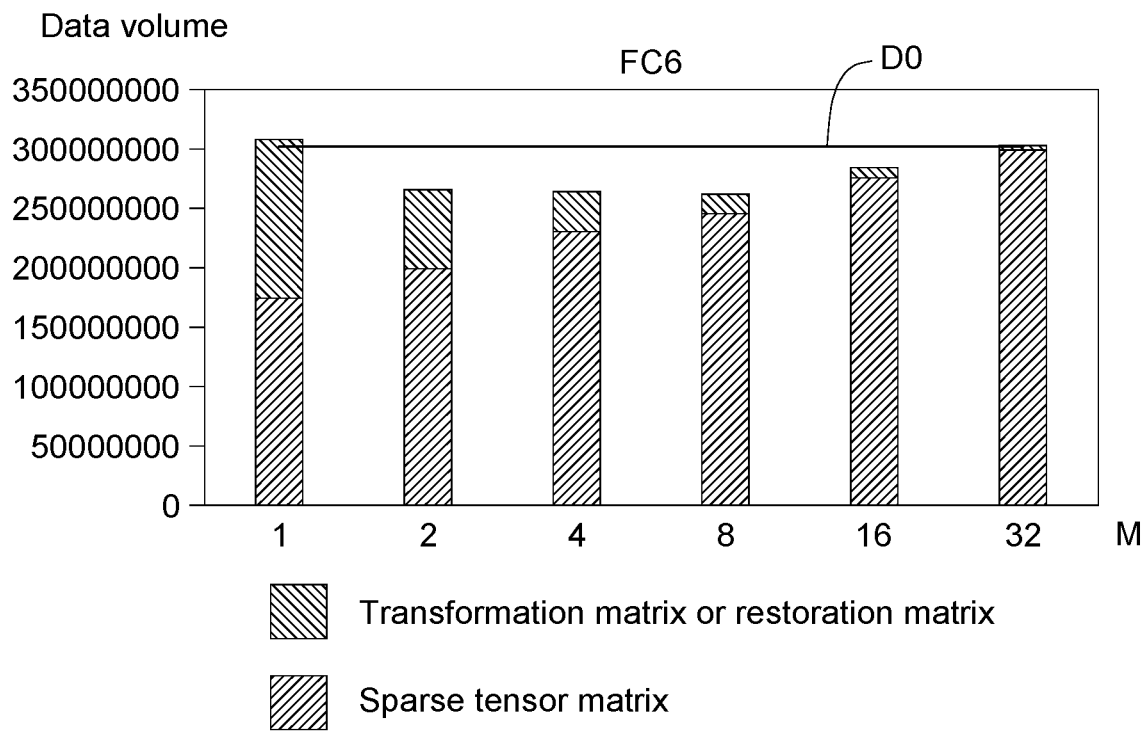
FIGS. 8F to 8H are comparison results of the data volumes corresponding to different full connect layers according to an embodiment.
Figure 8G:
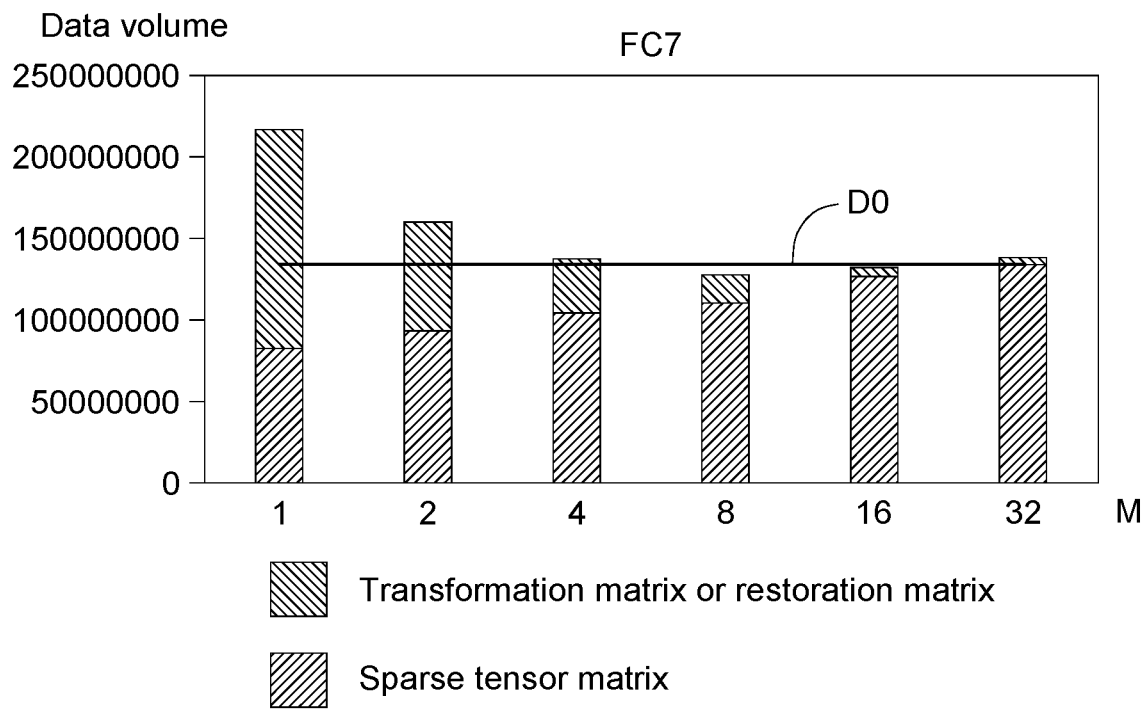
Figure 8H:
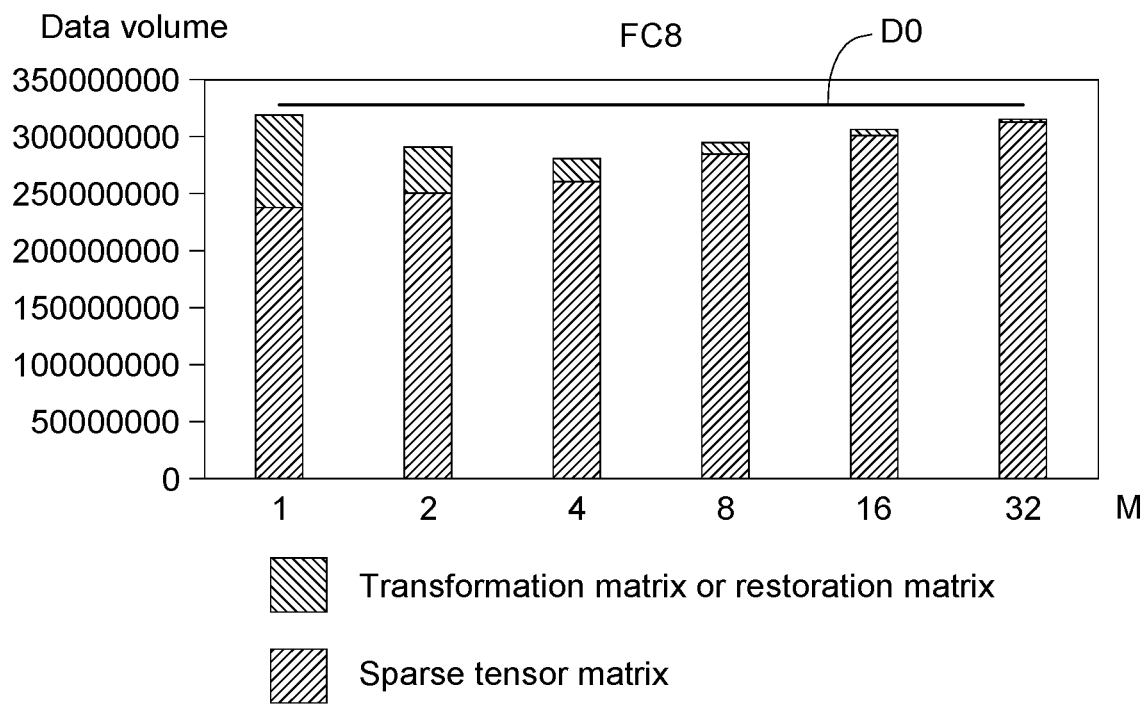

Referring to FIGS. 8F to 8H, comparison results of the data volumes corresponding to different full connect layers FC6 to FC8 according to an embodiment are shown. As indicated in FIG. 8F, in the full connect layer FC6, when M=2, 4, 8, 16 (that is, N=1, 2, 3, 4), the entire data volume is lower than the original data volume DO of the filter coefficient tensor matrix H, wherein the data compression system 300 can obtain the largest data restoration when the full connect layer FC6 sets M=8(N=3). As indicated in FIG. 8G, in the full connect layer FC7, when M=8 (that is, N=3), the entire data volume is lower than the original data volume DO of the filter coefficient tensor matrix H, therefore the data compression system 300 can obtain the largest data restoration when the full connect layer FC6 sets M=8(N=3). As indicated in FIG. 8H, in the full connect layer FC8, when M=2, 4, 8, 16 (that is, N=1, 2, 3, 4), the entire data volume is lower than the original data volume DO of the filter coefficient tensor matrix H, wherein the data compression system 300 can obtain the largest data restoration when the full connect layer FC8 sets M=4(N=2).

Figure 9:
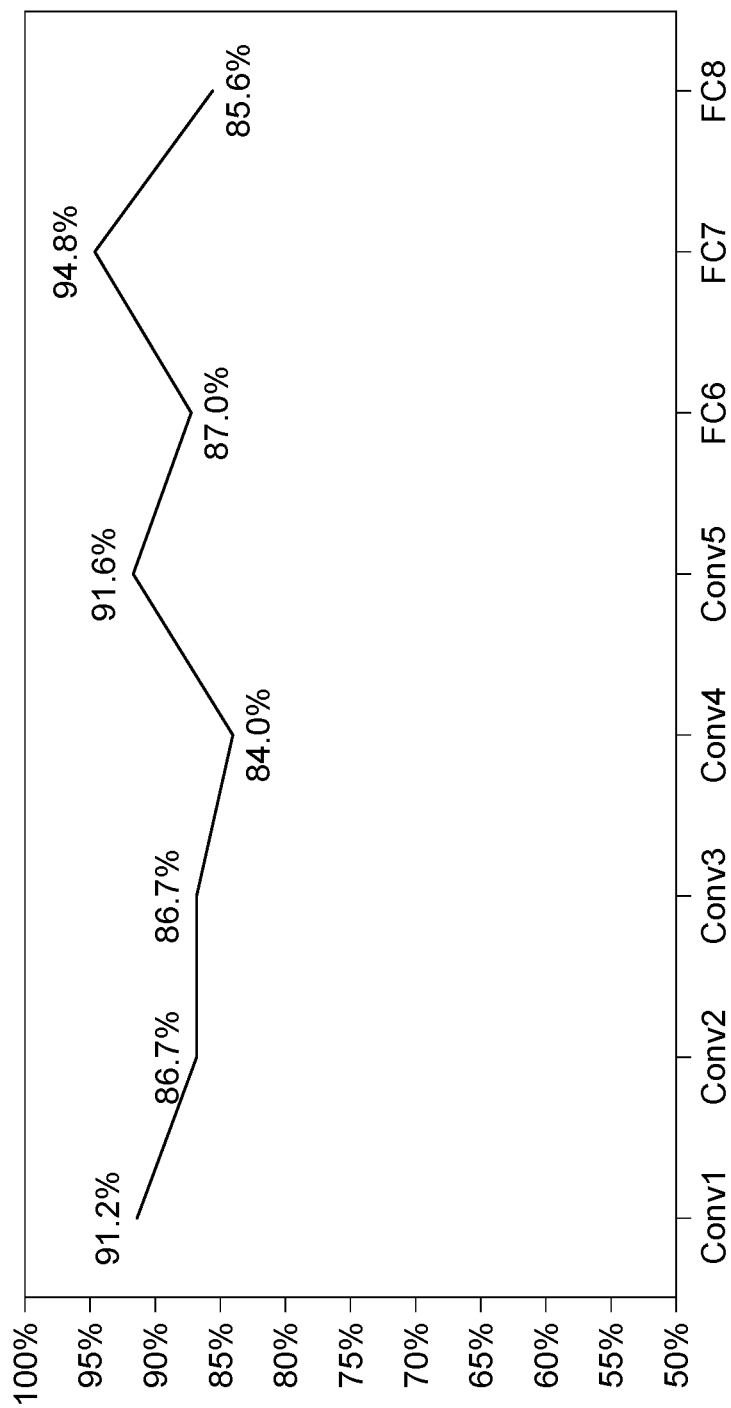
FIG. 9 is a curve of data restoration ratio vs convolution layers and full connect layers.

Referring to FIG. 9, a curve of data restoration ratio vs convolution layers Conv1 to Conv5 and full connect layers FC6 to FC8 is shown. As indicated in FIG. 9, when the matrix partition procedure is performed, most suitable values for M and N can be set in the convolution layers Conv1 to Conv5 and the full connect layers FC6 to FC8 to generate satisfactory data restoration ratios.

As disclosed in above embodiments, after the data that need to be stored in the memory 200 change to the compressible sparse tensor matrix W and the transformation matrix A, the restoration in data volume is significant. Thus, the data movement between the memory 200 and the deep learning acceleration chip 100 can be greatly reduced, and the operation speed of the deep learning acceleration chip 100 can be greatly increased. Additionally, the convolution operation result Y originally obtained using the filter coefficient tensor matrix H can be replaced by the convolution operation result Y' obtained using the sparse tensor matrix W, such that the convolution operation result Y' can be restored as the convolution operation result Y without loss of information and deteriorating the accuracy of operation.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A data compression method of a deep learning acceleration chip, comprising:
   obtaining a filter coefficient tensor matrix of a deep learning model;
   using a relationship that product of a transformation matrix and the filter coefficient tensor matrix is a sparse tensor matrix to convert the filter coefficient tensor matrix to the sparse tensor matrix and the transformation matrix is an orthonormal matrix;
   compressing the sparse tensor matrix; and
   storing the sparse tensor matrix and the transformation matrix, or storing the sparse tensor matrix and a restoration matrix, in a memory, wherein after the deep learning acceleration chip obtains a recognition data, the deep learning acceleration chip uses a relationship that product of the sparse tensor matrix and the recognition data is the convolution operation result and a relationship that product of the restoration matrix and the convolution operation result is a final convolution operation result, to obtain the final convolution operation result.

2. The data compression method of the deep learning acceleration chip according to claim 1, wherein the restoration matrix is a transpose matrix of the transformation matrix.

3. The data compression method of the deep learning acceleration chip according to claim 1, wherein the convolution operation result is restored without loss of information.

4. The data compression method of the deep learning acceleration chip according to claim 1, wherein in the step of decomposing the filter coefficient tensor matrix, the filter coefficient tensor matrix is partitioned into M parts, the at least one sparse tensor matrix has a quantity of M, the at least one transformation matrix has a quantity of M, and M is a natural number.

5. The data compression method of the deep learning acceleration chip according to claim 4, wherein M is 2N, and N is a natural number.

6. The data compression method of the deep learning acceleration chip according to claim 4, wherein the filter coefficient tensor matrix is equally partitioned.

7. The data compression method of the deep learning acceleration chip according to claim 4, wherein the sparse tensor matrixes have the same size.

8. The data compression method of the deep learning acceleration chip according to claim 4, wherein the transformation matrixes have the same size.

9. A data compression system of a deep learning acceleration chip, wherein the data compression system is used to reduce data movement for a deep learning model and comprises:
   a decomposition unit configured to use a relationship that product of a transformation matrix and the filter coefficient tensor matrix is a sparse tensor matrix to convert the filter coefficient tensor matrix to the sparse tensor matrix and the transformation matrix is an orthonormal matrix;
   a compression unit configured to compress the sparse tensor matrix; and
   a transfer unit configured to store the sparse tensor matrix and the transformation matrix, or store the sparse tensor matrix and a restoration matrix, in a memory, wherein after the deep learning acceleration chip obtains a recognition data, the deep learning acceleration chip uses a relationship that product of the sparse tensor matrix and the recognition data is the convolution operation result and a relationship that product of the restoration matrix and the convolution operation result is a final convolution operation result, to obtain the final convolution operation result.

10. The data compression system of the deep learning acceleration chip according to claim 9, wherein the restoration matrix is a transpose matrix of the transformation matrix.

11. The data compression system of the deep learning acceleration chip according to claim 9, wherein the convolution operation result is restored without loss of information.

12. The data compression system of the deep learning acceleration chip according to claim 9, wherein the decomposition unit further partitions the filter coefficient tensor matrix into M parts, the at least one sparse tensor matrix has a quantity of M, the at least one transformation matrix has a quantity of M, and M is a natural number.

13. The data compression system of the deep learning acceleration chip according to claim 12, wherein M is 2N, and N is a natural number.

14. The data compression system of the deep learning acceleration chip according to claim 12, wherein the filter coefficient tensor matrix is equally partitioned.

15. The data compression system of the deep learning acceleration chip according to claim 12, wherein the sparse tensor matrixes have the same size.

16. The data compression system of the deep learning acceleration chip according to claim 12, wherein the transformation matrixes have the same size.

* * * * *